Figure 1:
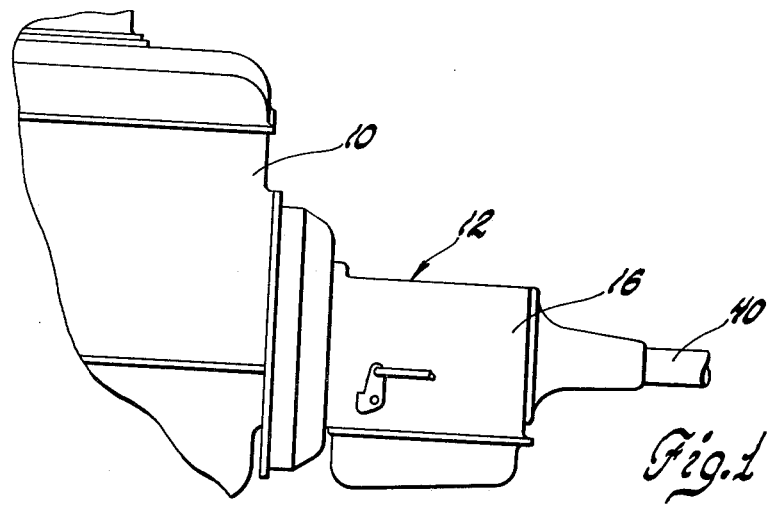

United States Patent [19]

Beardmore

[11] 4,180,977
[45] Jan. 1, 1980

[54] TORQUE CONVERTER WITH VARIABLE PITCH STATOR

[75] Inventor: John M. Beardmore, South Lyon, Mich.

[73] Assignee: General Motors Corporation, Detroit, Mich.

[21] Appl. No.: 954,971

[22] Filed: Oct. 26, 1978

[51] Int. Cl.² ............................................. F16D 33/04
[52] U.S. Cl. ...................................... 60/342; 60/362; 60/367
[58] Field of Search .................. 60/342, 361, 362, 367

[56] References Cited

U.S. PATENT DOCUMENTS

| | | | |
|---|---|---|---|
| 2,999,400 | 9/1961 | Kelley | 74/645 |
| 3,046,745 | 7/1962 | Price, Jr. et al. | 60/355 |
| 3,313,109 | 4/1967 | Tuck | 60/342 |

Primary Examiner—Edgar W. Geoghegan
Attorney, Agent, or Firm—Charles R. White

[57] ABSTRACT

Torque converter with a stator whose blades are selectively set at open and closed position to tailor converter operation for optimized vehicle performance and fuel economy. Turbine discharge pressure is routed to impeller side of stator control piston to move stator blades to low angle position for improved engine economy during vehicle coast down operation. Low angle stator is also used for economical anti-creep idle and for higher stall speeds and acceleration when needed. For economical cruising and other operation, the stator blades are set at their high angle or open position.

2 Claims, 2 Drawing Figures

TORQUE CONVERTER WITH VARIABLE PITCH STATOR

This invention relates to power transmissions for vehicles and more particularly to a new and improved torque converter with a stator whose blades can be selectively moved between open and closed positions using converter discharge pressure for moving the stator blades to a closed, low angle position for improved engine economy during coast down as well as for anti-creep idle and for improved acceleration.

Prior to the present invention, various torque converter designs have incorporated stators with variable pitch blading to improve transmission operation. Generally, the stator blades were positioned at a predetermined open position, often referred to as the high angle position, for high torque converter efficiency and torque transmittal desired for economical vehicle operation. Under certain conditions, such as when performance is desired, the engine throttle is opened and the stator is set by controls to a predetermined closed or low angle position. Under such conditions, the converter torque capacity is reduced so that engine torque can be increased for performance. During engine idle the low output torques of the engine are not efficiently transmitted through the converter with closed stator blading so that the tendency of the vehicle to creep is effectively reduced. While such prior converters have provided these and other improvements, they generally offer no advantages or economies in operations such as high speed coast down as when exiting from an expressway.

In contrast to the prior art constructions, the stator blades of the converter of the present invention are closed during coast down. Under such conditions, the path of fluid flow from the turbine to the impeller is interrupted and the turbine will accordingly not be able to motor the engine as efficiently as when the stator blades are set at the high angle position. This causes the engine speed to drop by several hundred rpms and with reduced engine speed, fuel consumption is accordingly reduced. Normally, during such high engine speed operation, turbine discharge pressure tends to force the blades of the stator to the open position. However, with this invention the turbine discharge pressure is effectively routed to act on the impeller side of the stator blade control piston to move the stator blades to a closed position. Specifically, in this invention, the back side of the chamber for the stator piston is enclosed by a plate sealing it off from converter charging pressure. With stator apply pressure removed from the front or turbine side of the piston and with turbine discharge pressure directed to the back side of the piston, the stator blades are moved to the low angle or closed position as desired for vehicle operation. When high angle or open blade position is desired, for economical converter operation, a stator apply pressure is directed to the turbine side of the piston to overcome turbine discharge pressure so that the piston is stroked to move the blades of the stator to the open blade position.

In this invention, during coast down, engine braking is available since the turbine still motors the impeller and the vehicle engine coupled thereto.

It is a feature, object and advantage of this invention to provide a new and improved torque converter with variable pitch stator blading which provides for the advantageous use of turbine exit pressure to close the blades of the stator for improved economics during coast down modes of operation as well as for improved converter operation during acceleration and idle operations.

Another feature, object and advantage of this invention is to provide a new and improved torque converter with variable pitch stator blades in which turbine exit pressure is rerouted from the exit of the turbine to the impeller side of the piston which controls stator blade angularity so that the blades will remain at a closed position during operations such as coast down and during engine idle operation to reduce any tendency of vehicle to creep.

Figure 2:
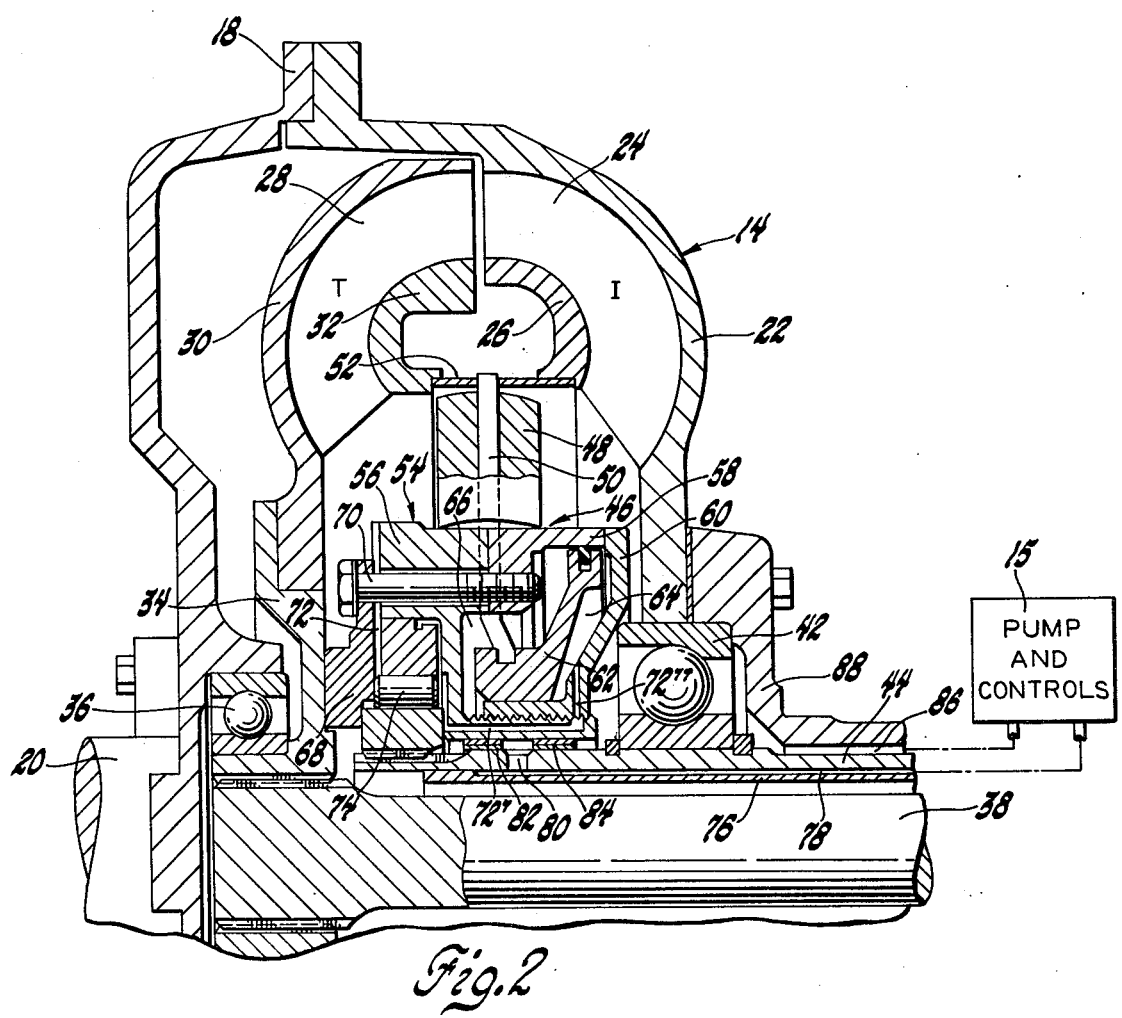

These and other features, objects and advantages of this invention will be more apparent from the following detailed description and drawing in which:

FIG. 1 is a side elevational view of a portion of an internal combustion engine coupled to a torque converter change speed transmission; and FIG. 2 is a sectional view of a portion of the engine and an upper half of the torque converter of this invention.

Turning now in greater detail to the drawing, there is shown an internal combustion engine 10 operatively connected to a change speed transmission 12. The transmission 12 includes a torque converter 14 shown in FIG. 2 and change speed gearing, not shown, and controls 15 disposed within the stationary transmission housing 16 having its forward end bolted or otherwise secured to the end of the engine. The torque converter has a front housing or cover 18 driven by an output 20 of engine 10 which in turn is drivingly connected to a rear cover 22. An annular series of spaced vanes 24 is secured to the rear cover and to a radially spaced inner shell 26 to provide an impeller I that is rotatably driven by the output of the engine through front cover 18. A second series of spaced vanes 28 corresponding to the vanes of the impeller is secured to the outer and inner shells 30 and 32 to form a turbine T which is drivingly connected to an annular hub member 34. This hub member is rotatably supported with respect to the front cover 18 by annular bearing 36 and is centrally splined to the forward end of an elongated converter output shaft 38 which extends along the longitudinal axis of the converter and transmission and serves as an input to the change speed gear unit within housing 16. The gear unit in turn drives the transmission output shaft 40 in accordance with the gear ratio selection afforded by the controls 15. Bearing 42 mounted on ground sleeve 44 rotatably supports the converter impeller I which pumps converter operating fluid into the turbine blading to turn the turbine T, the hub member 34 and the connected output shaft 38.

The torque converter includes a stator assembly 46 which has an annular series of vanes 48 located between the turbine T and impeller I. The stator blades are securely mounted on outer end portions of crank arms 50 and between an outer annular shroud 52 and an inner carrier 54 of the stator assembly. The carrier includes a pair of main body parts 56 and 58 which provide a recess or cavity closed by a disc-like rear cover plate 60, threaded or otherwise mounted on main body part 56, to receive an annular piston 62 mounted for axial sliding movement therein. The piston has an axially extending hub portion formed with openings to receive the ends of the crank arms 50 and separates the cavity into pressure chambers 64 and 66. The hub assembly further includes annular spacer plate 68 which is connected to the main body parts of the carrier by bolts 70 and cooperates therewith to form a portion of the fluid passage 72 which is hydraulically connected to pressure chamber 64 for conducting turbine discharge pressure into the piston chamber 62 to control stator blade angle as will appear below. As shown, passage 72 feeds through a conventional one-way brake 74 and continues through a horizontal passage 72′ in body part 56 and then through vertical passage 72″ in the rear cover plate 60 into chamber 64. The one-way brake 74 is operatively mounted between the ground sleeve 44 and the main body part 56 of the carrier to retard rotation of the stator during the torque multiplying phase of converter operation and to permit the stator to free wheel during the coupling phase of converter operation.

Disposed between the ground sleeve 44 and the converter output shaft 38 is an intermediate cylindrical sleeve 76 which cooperates with the ground sleeve to provide a stator apply line 78 leading from the controls 15 which is connected by radial passage 80 in the ground sleeve to an annular recess formed between annular bearings 82 and 84 disposed between the ground sleeve and the internal diameter of the carrier. Inclined passages, not shown, in the body parts of the carrier, connect the annular recess to the chamber 66 so that a high pressure can be fed to chamber 66 to control the angularity of the stator blades by moving them to a high angle position when desired. Converter charging pressure is supplied from a conventional engine driven pump and controls 15 through a suitable passage such as passage 86 between the ground sleeve 44 and the cover extension 88.

In this invention, there is improvement in fuel economy by having the engine loosely coupled to the transmission gearing by setting the converter stator blades at their low angle position during idle and coast down modes of operation to allow lower and more economical engine speed. With this invention, turbine exit pressure is rerouted to the impeller side of the stator piston so that under all operating conditions where desired the stator blades will remain closed. Thus, with the stator apply pressure removed, at any engine speed, turbine exit pressure is directed around the one-way clutch and through the carrier hub to the volume on the back side of the piston.

At extremely high engine speeds and at stall, stator apply pressure is increased so as to open the stator by overcoming turbine exit pressure. The transmission pump and the controls furnish full line pressure into chamber 66 through the stator apply line 78. With chamber 66 so pressurized, turbine exit pressure is overcome and the piston 62 will stroke rearwardly to move the stator blades to their high angle position. With this invention, the coast down fuel economy, as when exiting from expressway, results from being able to fully close the stator and thereby interrupting the fluid flow from the turbine back to the impeller. Thus, the turbine will not be able to motor the engine as efficiently which causes the engine speed to drop several hundred rpms. With reduced engine speed, there is reduced fuel consumption by the engine to provide the economy. Additionally with this construction, engine braking is provided to assist vehicle brakes so that the modified variable pitch stator of this invention provides a good compromise between coast down fuel economy and braking plus offering improved idle fuel economy and increased performance when needed with the stator blades set at low angles.

While a preferred embodiment of this invention has been shown and described to illustrate the invention, other embodiments will become apparent to those skilled in the art. Accordingly, the scope of this invention is set forth in the following claims.

I claim:

1. A hydro-dynamic torque converter for a wheeled ground vehicle for transmitting and multiplying the output torque of an internal combustion engine comprising bladed fluid impeller means drivingly connected to said engine, bladed turbine means for receiving fluid circulated by said impeller means, output means rotatably driven by said turbine means, a stator assembly having a hub portion and a plurality of blades operatively disposed between the exit of said turbine and the entrance of said impeller means, mounting means supporting said blades on said hub portion for movement between open and closed position for controlling the direction of fluid exiting from said turbine means into said impeller means, hydraulically actuated piston means in said converter for moving said stator blades between said open and closed positions, a cavity in said hub portion for said piston means and cooperating therewith to form first and second chambers therein, a source of pressure oil for said converter, passage means connecting said source to a first of said chambers for biasing said piston in a direction to move said blades to an open position for optimized efficiency for vehicle cruising operation, and second passage means for feeding pressure fluid exiting from said turbine to said second chamber for biasing said piston in a direction to move said stator blades to a closed position whereby the flow path in said converter is changed to reduce the drive of said pump by the fluid discharged from said turbine to thereby reduce engine speed and to thereby improve the operating economy of said engine.

2. A hydro-dynamic torque converter for a wheeled ground vehicle for transmitting and multiplying the output torque of an internal combustion engine comprising bladed fluid impeller means drivingly connected to said engine, bladed turbine means for receiving fluid circulated by said impeller means, output means rotatably driven by said turbine means, a stator assembly having a hub portion and a plurality of blades operatively disposed between the exit of said turbine and the entrance of said impeller means, mounting means supporting said blades on said hub portion for movement between open and closed position for controlling the direction of fluid exiting from said turbine means into said impeller means, hydraulically actuated piston means in said converter for moving said stator blades between said open and closed positions, a cavity in said hub portion for said piston means, a plate secured to said hub portion for closing said cavity, said piston being slidably mounted in said cavity and cooperating therewith to form first and second expansible and contractible chambers therein, a source of pressure oil for said converter, passage means connecting said source to a first of said chambers for biasing said piston in a first direction to move said blades to an open position for optimized efficiency for vehicle cruising operation, and second passage means for feeding pressure fluid exiting from said turbine to said second chamber for biasing said piston in a direction opposite from said first direction to move said stator blades to a closed position whereby the flow path in said converter is changed to reduce the drive of said pump by the fluid discharged from said turbine to thereby reduce engine speed and to thereby improve the operating economy of said engine.

* * * * *